(12) United States Patent
Mahoney

(10) Patent No.: US 6,969,279 B1
(45) Date of Patent: Nov. 29, 2005

(54) EXTERIOR CONNECTION WEATHER SEAL

(75) Inventor: William G. Mahoney, Suwanee, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 10/838,938

(22) Filed: May 4, 2004

(51) Int. Cl.[7] .............................................. H01R 13/40
(52) U.S. Cl. .................................................... 439/589
(58) Field of Search ................................ 439/368, 373, 439/495, 587, 521, 274, 275, 589; 174/66 SS

(56) References Cited

U.S. PATENT DOCUMENTS

| | | | |
|---|---|---|---|
| 3,904,812 A * | 9/1975 | Daffron | 174/52.3 |
| 4,161,156 A * | 7/1979 | Sato et al. | 440/113 |
| 4,237,342 A | 12/1980 | Eller et al. | 179/1 PC |
| 5,354,208 A | 10/1994 | Salaski et al. | 439/230 |
| 5,431,583 A | 7/1995 | Szegda | 439/589 |
| 5,504,424 A | 4/1996 | Graf et al. | 324/174 |
| D430,542 S | 9/2000 | Hoferitza et al. | D13/154 |
| 6,148,862 A | 11/2000 | Doll | 137/884 |
| 6,340,250 B1 | 1/2002 | Auclair | 385/87 |
| 6,394,507 B1 | 5/2002 | Baker | 285/368 |
| 6,428,357 B1 | 8/2002 | Dolinshek et al. | 439/606 |
| 6,435,911 B1 | 8/2002 | Payson et al. | 439/606 |
| 6,443,764 B2 | 9/2002 | Makita | 439/587 |
| 6,478,608 B1 | 11/2002 | Grant et al. | 439/468 |
| D478,550 S | 8/2003 | Garver | D13/146 |
| 6,679,730 B2 | 1/2004 | Dye et al. | 439/606 |

* cited by examiner

Primary Examiner—J. F. Duverne

(57) ABSTRACT

A housing assembly for protecting at least one cable connection from the exterior environment. In one embodiment, the housing assembly includes a shroud portion extending outward from the housing assembly to at least partially shroud the connection of the cable to the housing assembly. At least one resilient portion is configured to be received within the shroud portion to seal the cable from the exterior environment. The resilient portion may be installed or removed without uncoupling the cable from the housing assembly. The resilient portion may be compressed when received and retained within the shroud portion.

29 Claims, 5 Drawing Sheets

EXTERIOR CONNECTION WEATHER SEAL

CROSS REFERENCE TO RELATED APPLICATIONS

This utility application is related to U.S. design application Ser. No. 29/204,748 entitled "HOUSING ASSEMBLY WITH CONNECTION SHROUD", and U.S. design application Ser. No. 29/204,781 entitled "CONNECTION SHROUD PORTION", both to the same inventor, which are incorporated herein by reference, and having been filed concurrently with the present design application.

TECHNICAL FIELD

The present invention relates to housing assemblies and, more particularly, relates to providing a weather-tight seal for a cable connected to a housing assembly.

BACKGROUND OF THE INVENTION

There are numerous types of housing assemblies available to day. Many of the housing assemblies define an interior for electronic circuitry that is to be protected from the exterior environment. Many of the housing assemblies also provide for a cable such an Ethernet cable to be connected to the housing. However, these known housing assemblies are not intended to be exposed to adverse weather such as rain when utilized outside because moisture could easily seep into the housing assembly through the cable connection. Therefore, today's housing assemblies do not have a sufficient means of sealing connections to prevent moisture from entering the housing assembly when the housing assembly is utilized outdoors.

What is needed is a weather-tight seal around the cable connection so that the housing assembly may be utilized outdoors. The seal should be able to be installed or removed without having to disconnect the cable from its connection with the housing assembly.

DETAILED DESCRIPTION

Figure 1:
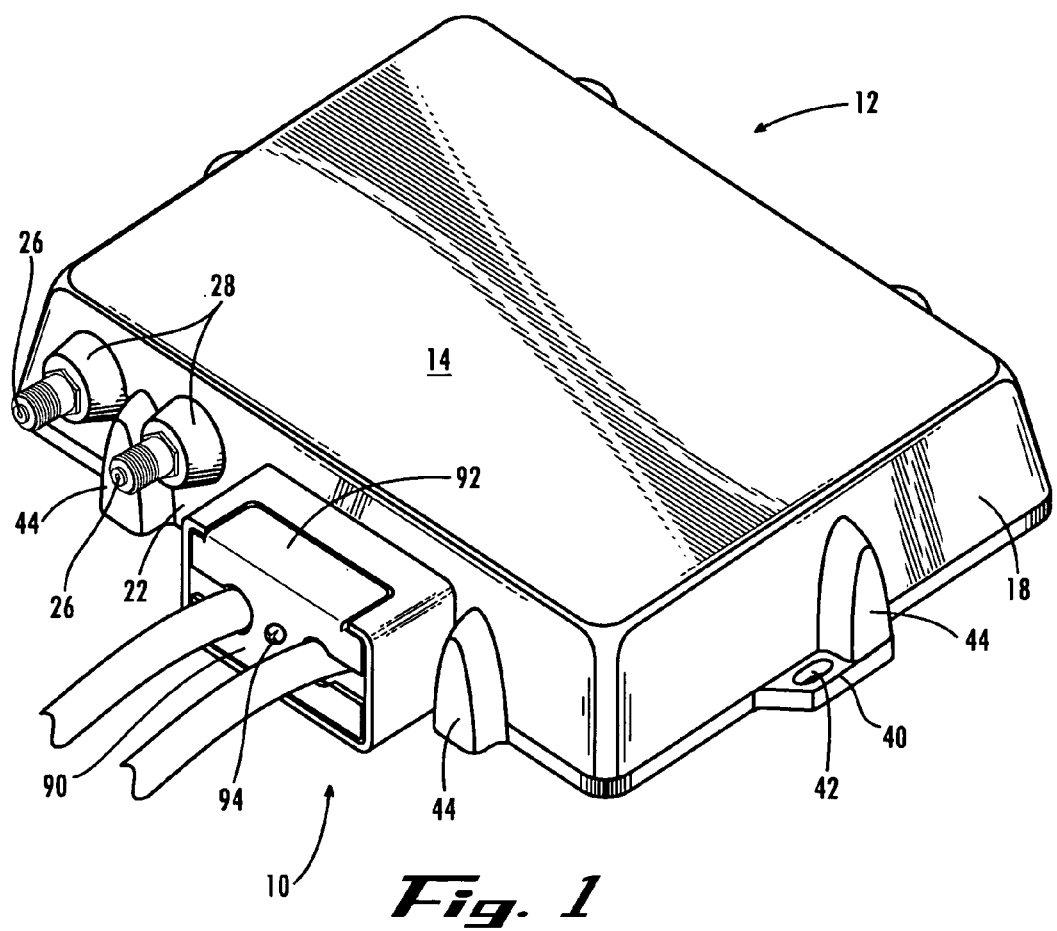
FIG. 1 illustrates a top perspective view of one embodiment of a housing assembly having a weather-tight seal around a pair of connected cables.
Figure 2:
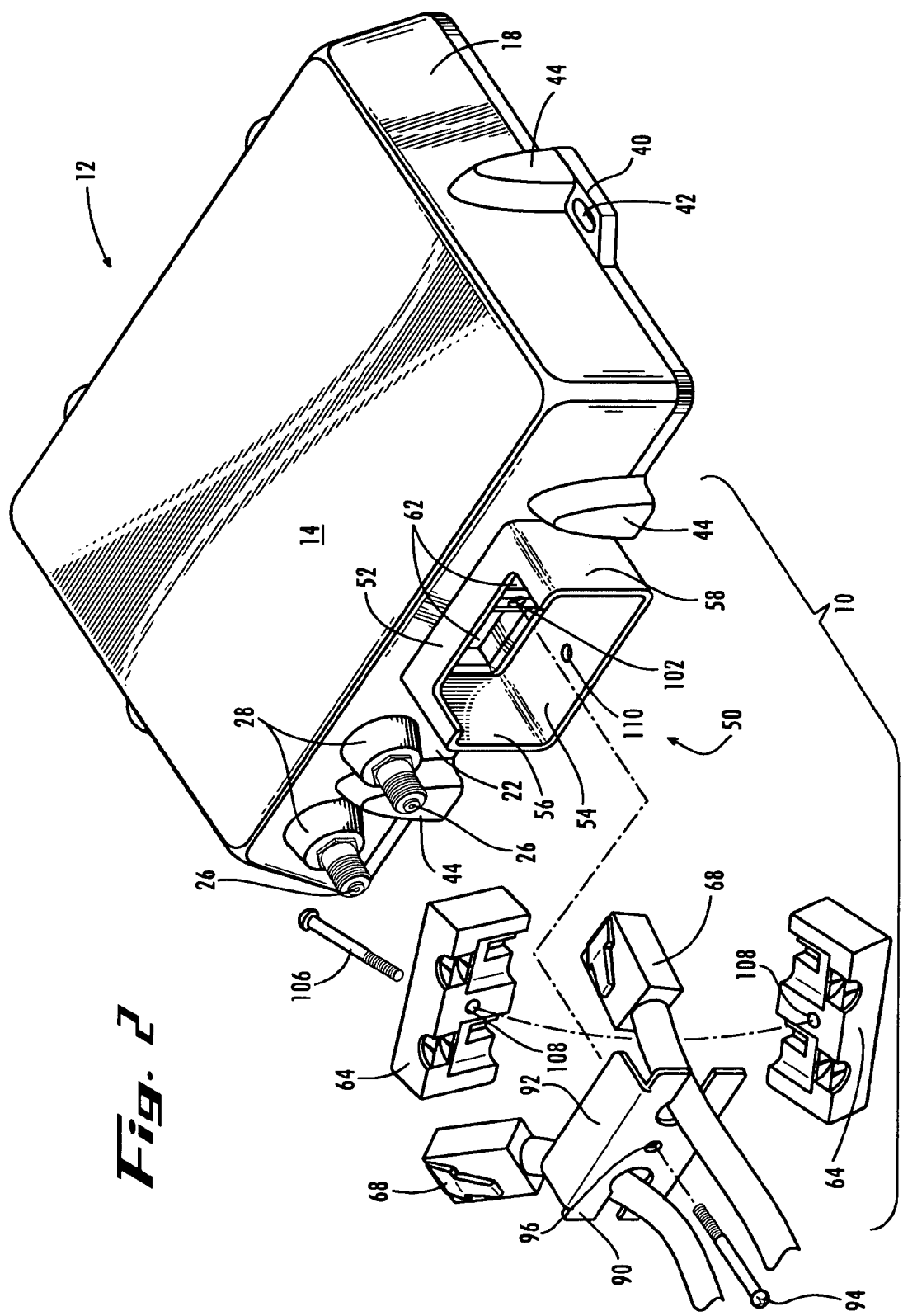
FIG. 2 is an exploded perspective view of the weather-tight sealed housing assembly of FIG. 1.

The present invention solves the above-identified problem by providing a weather-tight seal assembly 10 configured to permit connection of at least one cable such as an Ethernet cable to a housing assembly 12. Referring now to the drawings in which like numerals indicate like elements throughout the several views, FIGS. 1 and 2 illustrate an exemplary embodiment of the housing assembly 12 with weather-tight seal assembly 10 of the present invention.

Figure 3:
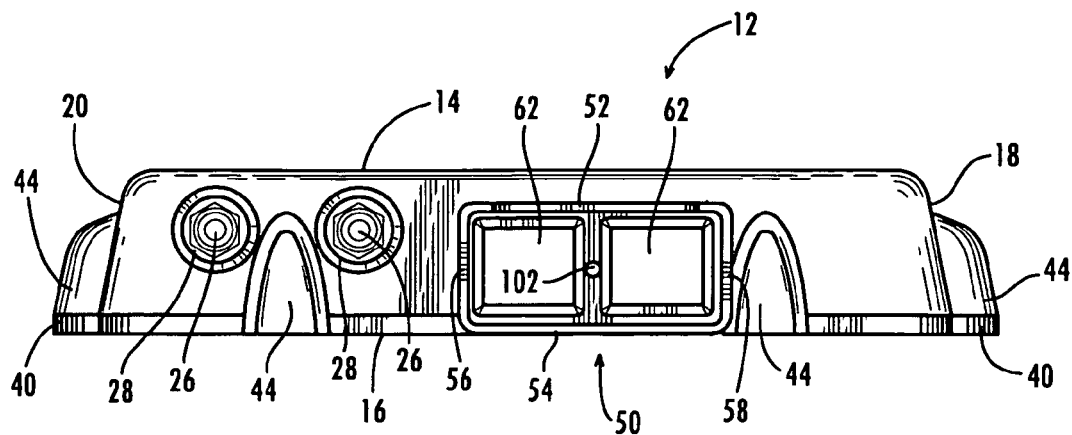
FIG. 3 is a front view of the housing assembly of FIG. 1 without the seal assembly.
Figure 4:
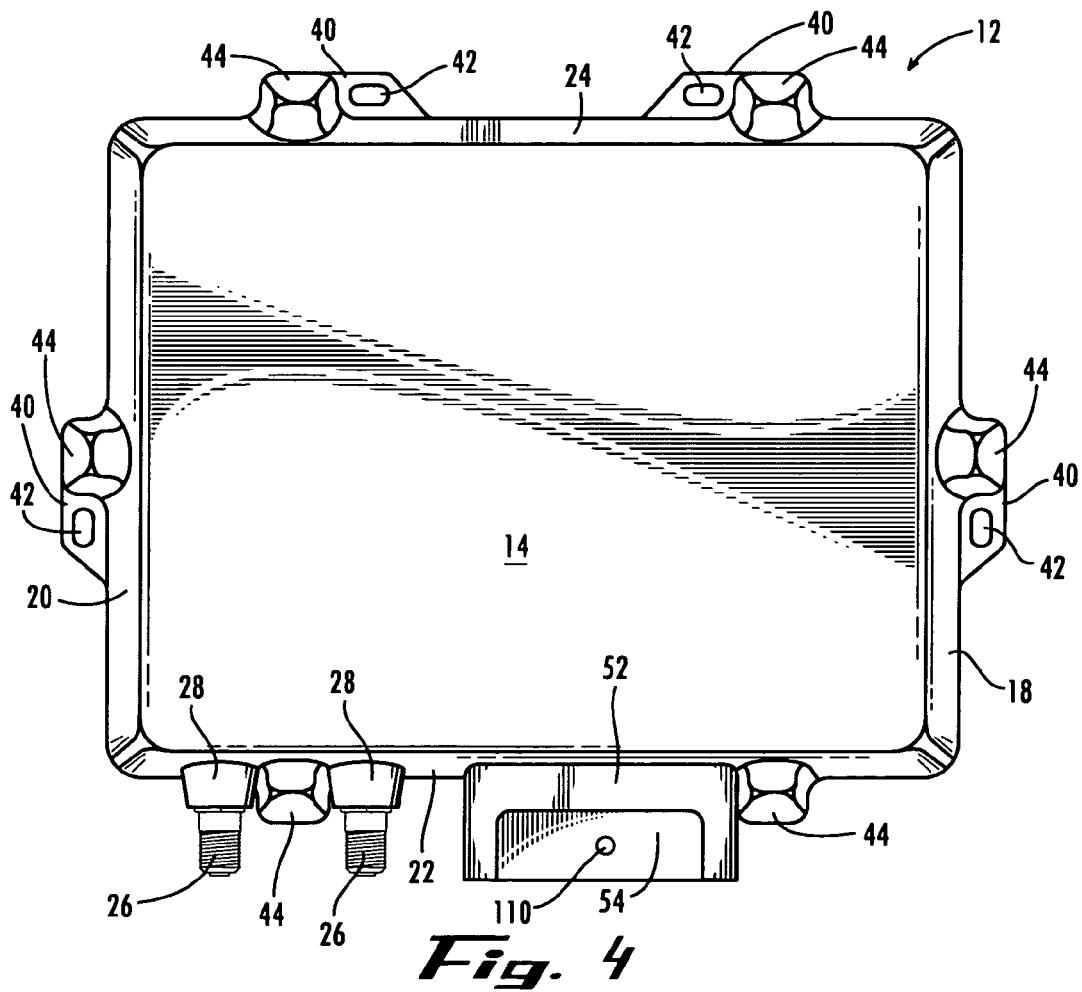
FIG. 4 is a top view of the housing assembly of FIG. 1 without the seal assembly.
Figure 5:
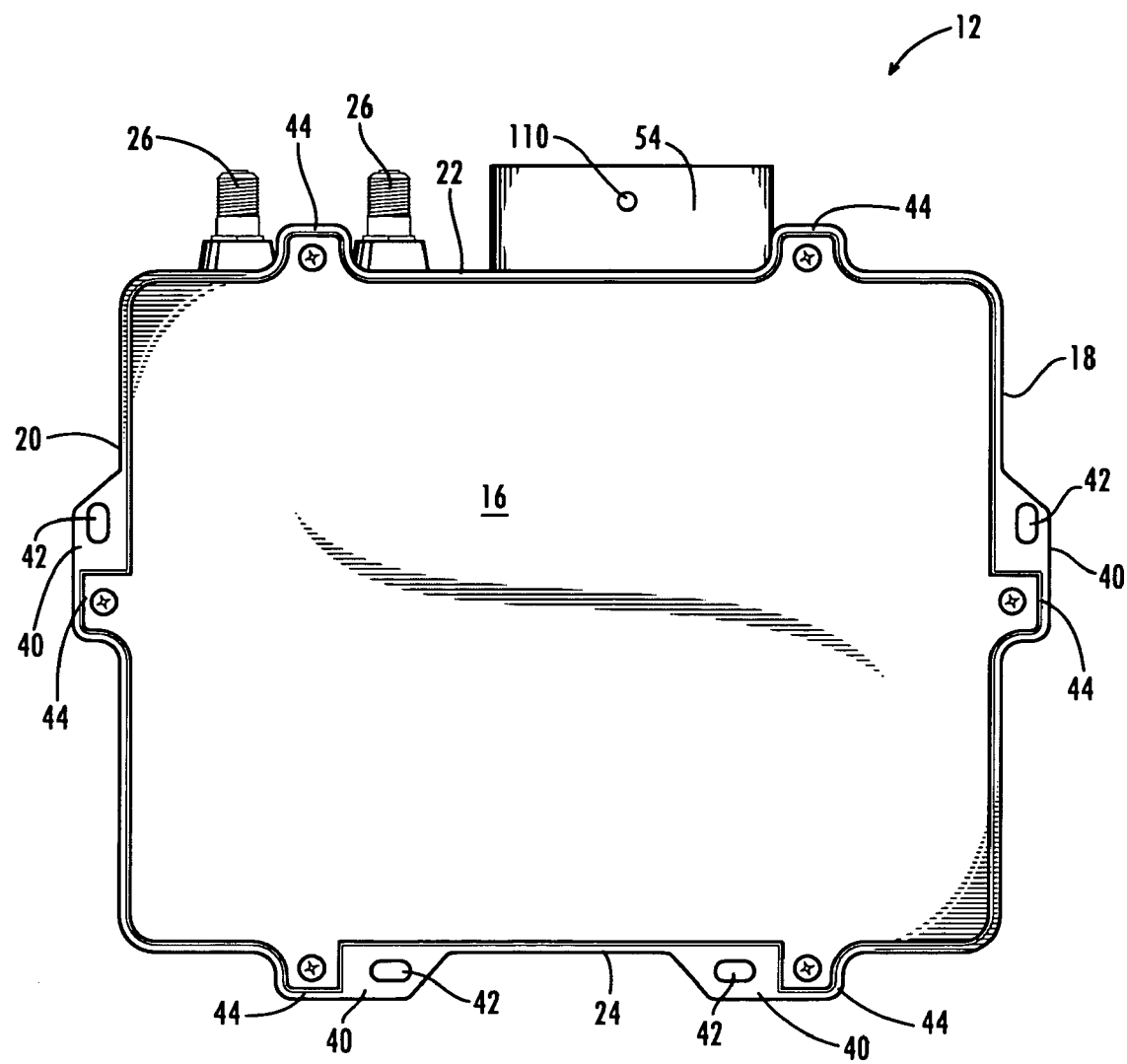
FIG. 5 is a bottom view of the housing assembly of FIG. 1 without the seal assembly.
Figure 6:
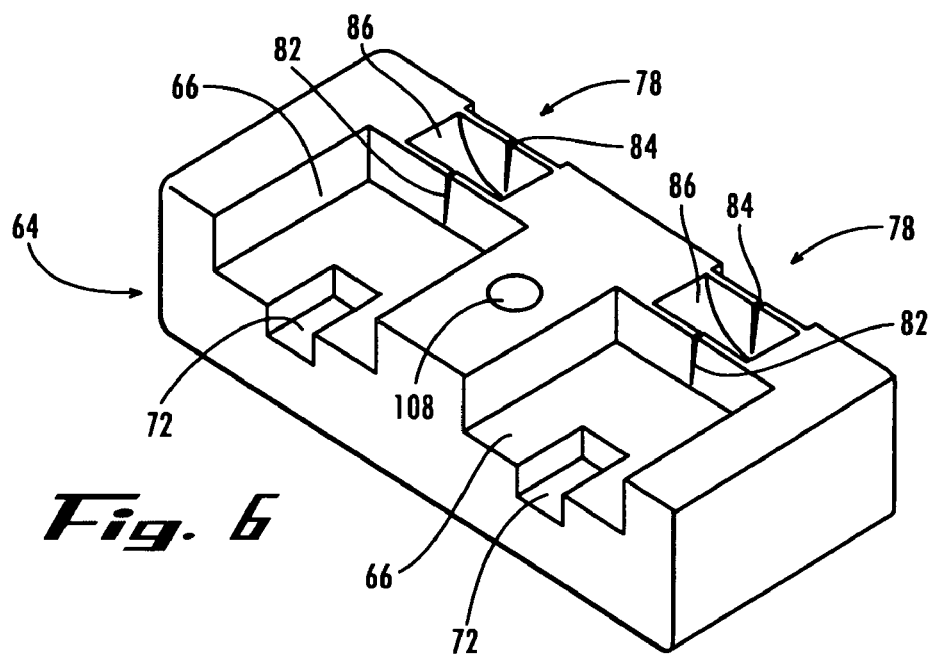
FIG. 6 is a front perspective view of one embodiment of a resilient portion of the seal assembly utilized in forming the seal of the present invention.
Figure 7:
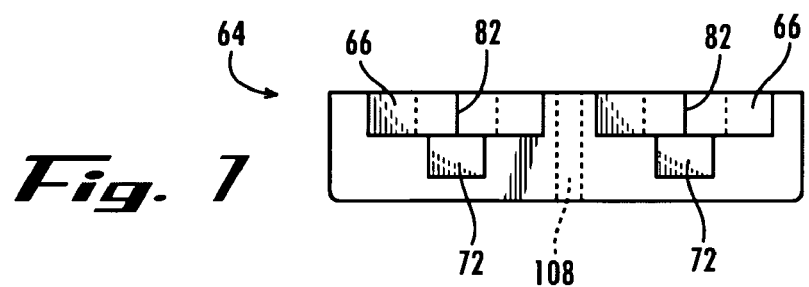
FIG. 7 is a front view of the resilient portion of FIG. 6.
Figure 8:
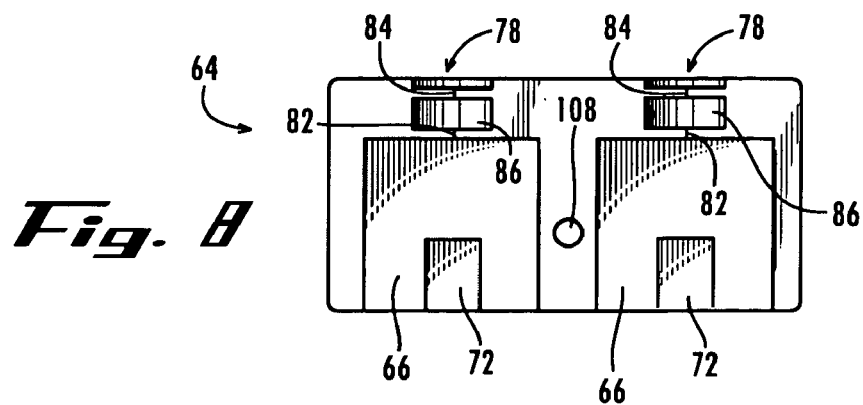
FIG. 8 is a top view of the resilient portion of FIG. 6.
Figure 9:
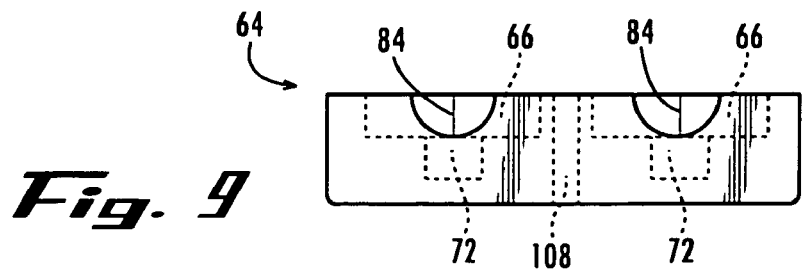
FIG. 9 is a back view of the resilient portion of FIG. 6.

In one embodiment, as best shown in FIGS. 3–5, the housing assembly 12 includes an interior space defined by top 14, bottom 16, opposing sides 18 and 20, and opposing ends 22 and 24. The housing assembly 12 may be made of any material suitable for providing structural support and protection for the interior of the housing assembly 12 from the exterior environment. The interior of the housing assembly 12 may include electronics. Preferably, the housing assembly 12 is two different die cast parts where a face plate or top half (top 14, opposing sides 18 and 20, and opposing ends 22 and 24) packages circuitry and a back cover or lower half (bottom 16) are combined to seal the circuitry from the exterior environment.

The housing assembly 12 may include any number of connectors 26. The connectors 26 are preferably waterproof F-type connectors that utilize waterproof thread sealant when connecting to corresponding cable connectors. The number and arrangement of connectors 26 is dependent upon the purpose of the housing assembly 12 and the circuitry within the housing assembly 12. Each of the projecting portions of the housing assembly 12 from which the connectors 26 extend may be referred to as a boss 28. A bore of each boss 28 supports a corresponding connector 26.

As best shown in FIG. 5, the housing assembly 12 includes mounting tabs 40 with slots 42. Preferably, each of the mounting tabs 40 extend outward from the top half of the housing assembly 12. Each of the slots 42 is preferably elongated to provide for horizontal and vertical adjustments when the housing assembly 12 is mounted to a surface such as a vertical wall. Adjacent some of the mounting tabs 40 are bosses 44 that extend from the top half of the housing assembly 12. The bosses 44 are configured to accommodate fasteners for securing the bottom 16 to the top 14. When mounting the housing assembly 12, it is preferable that the housing assembly 12 is mounted on a vertical surface with the top 14 facing outward, the end 22 oriented downward, and the opposing end 24 oriented upward. In such case, the end 22 is protected overhead by the remainder of the housing assembly 12.

Referring back to FIG. 2, one embodiment of the sealing assembly 10 includes a shroud portion 50 extending from a body such as the housing assembly 12. The shroud portion 50 is defined by a top portion 52, a bottom portion 54, and side portions 56 and 58. The shroud portion 50 shrouds at least one port 62 corresponding with a jack assembly on a circuit board within the housing assembly 12. Preferably, the shroud portion 50 shrouds a pair of side-by-side ports 62 as best shown in FIG. 3. The shroud portion 50 extends outward from the housing assembly 12 to define a cavity for receiving resilient portions 64. When the housing assembly 12 is mounted on a vertical surface as explained above, the shroud portion 50 extends downward from the end 22 of the housing assembly to provided further environmental protection to the ports 62. A portion of the top portion 52 of the shroud portion 50 is preferably cutout to provide greater access to the ports 62. Because of the cutout portion, the top portion 52 does not extend out as far as does the side portions 56, 58 and the bottom portion 54. The resilient portions 64 are preferably molded from either neoprene or Ethylene Propylene Diene Monomer, or the equivalent.

FIGS. 6–9 illustrate the preferred embodiment for one of a pair of resilient portions 64. The resilient portion 64 shown in FIGS. 6–9 is preferably one of two resilient portions 64 that are symmetric with one another. When matted with one another, the two resilient portions 64 may be referred to as an upper resilient portion 64 and a lower resilient portion 64. The resilient portion 64 shown in FIGS. 6–9 cooperates with another similar resilient portion 64 to wrap around a pair of plugs 68 when the plugs 68 are positioned in a side-by-side manner in the cavities formed from the mated resilient portions 64.

In one embodiment, each resilient portion 64 includes at least one cavity 66 that is shaped to conform to a portion of the cable to be sealed. For example, the cavities 66 of a pair of matted resilient portions 64 together could define an interior space corresponding to the shape of a plug 68 on the end of an Ethernet cable. Also, each of the resilient portions 64 could include another cavity 72 communicating with each cavity 66 for the resilient latch 74 of each plug 68. Both the upper and lower resilient portions 64 could include the cavities 72 so that the upper and lower resilient portions 64 are interchangeable with one another.

Because the upper and lower resilient portions 64 are designed to cooperate with one another and with the shroud portion 50 to form a seal with the cables in between, portions of the cables must pass in between the mated resilient portions 64. Consequently, each of the resilient portions 64 includes a baffle assembly 78 to facilitate placement of the cable and allow each cable to pass between the resilient portions 64. Each one of the baffle assemblies 78 of the lower resilient portion 64 mates up with a corresponding one of the baffle assemblies 78 of the upper resilient portion 64. In one embodiment, each baffle assembly 78 allows a portion of a cable to pass from the interior space defined between mated resilient portions 64 to the exterior of the seal formed by the mated resilient portions 64. Each baffle assembly 78 includes scoring to accommodate the cables. In one embodiment, the scoring of each baffle assembly 78 includes a score line 82, a score line 84, with a cavity 86 in between the score lines 82 and 84. The score lines 82, 84 in cooperation with the cavity 86 of each baffle assembly 78 allow matted resilient portions 64 to accommodate a cable because the score lines 82, 84 and cavity 86 provide greater flexibility surrounding the cable while still providing a tight seal around the cable. The score lines 82, 84 may be allowed to separate or tear somewhat to accommodate larger cables when the resilient portions 64 are compressed as described below.

Once the plugs 68 of the cables are retained in the ports 62, the resilient portions 64 are placed in the shroud portion 50 with the cables sandwiched in between. An end plate 90 is placed over the mated resilient portions 64. Preferably, the end plate 90 includes an angled flange portion 92 that is configured to correspond with the cutout portion in the top portion 52 of the shroud portion 50 as best shown in FIG. 1. The end plate 90 is used to compress the resilient portions 64 is the shroud portion 50 with a fastener 94 such as a threaded screw or bolt. Preferably, the fastener 94 passes through the end plate 90 at an opening 96, in between each of the matted resilient portions 64, to then be received and retained in an opening 102 between the ports 62 in the housing assembly 12. The fastener 94 is then tightened against the housing assembly 12 to compress the resilient portions 64 around the cables. Alternatively, another fastener 106 may be used to compress the resilient portions 64. The fastener 106 may pass through an opening 108 formed in each of the resilient portions 64 and received and retained in an opening 110 to compress the resilient portions 64 against the bottom portion 54 of the shroud portion 50. However, if both fasteners 94 and 106 are used simultaneously, the fasteners 94 and 106 must be offset from one another when passing through the resilient portions 64. If the fasteners 94, 106 are used simultaneously, fastener 106 should be fastened first so that the flange portion 92 of the end plate 90 then may cover the top of the fastener 106. Alternatively, the end plate 90 may include an opening for receiving the fastener 106 therethrough.

In an alternative embodiment, one resilient portion may be used instead of a pair of resilient portions 64. In such case, the one resilient portion itself would be configured to be received in the shroud portion 50. A baffle assembly would be included for each cable to pass through the one resilient portion. Each baffle assembly of the one resilient portion should be large enough to allow a plug 68 to pass through the one resilient portion 64. Once the plug 68 has passed through the one resilient portion to have the cable in the baffle assembly, the one resilient portion may then be pushed or pulled up and down the length of the cables.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A seal assembly for sealing at least one cable coupled to a body, said seal assembly comprising:
   a shroud portion extending from the body to at least partially shroud the connection of the cable to the body; and
   at least one resilient portion configured to be received within said shroud portion to seal at the connection of the cable to the body from the exterior environment, said resilient portion compressed against the connection of the cable to the body when received and retained within said shroud portion, and said resilient portion adapted to be installed against or removed from being against the connection without uncoupling the cable from the body.

2. The seal assembly of claim 1 comprising a pair of resilient portions received within said shroud portion with the cable placed in between said resilient portions.

3. The seal assembly of claim 2 wherein each resilient portion of said pair of resilient portions is substantially identical to one another.

4. The seal assembly of claim 2 wherein said resilient portions are symmetrically shaped relative one another and configured to mate with one another.

5. The seal assembly of claim 2 wherein said resilient portions when combined with one another define an interior space for receiving the cable.

6. The seal assembly of claim 1 wherein said resilient portion comprises an interior space for receiving at least a portion of the cable, said interior space defined by at least one baffle portion to facilitate placement of the cable within said interior space of said resilient portion.

7. The seal assembly of claim 6 wherein said baffle portion is at least partially defined by scoring.

8. The seal assembly of claim 7 wherein a portion of said resilient portion is separated along said scoring to accommodate the cable.

9. The seal assembly of claim 1 further comprising an end plate configured to be received within said should portion, said end plate for compressing said resilient portion within said shroud portion to seal the cable.

10. The seal assembly of claim 9 further comprising an opening on the body within said shroud portion for receiving and retaining a fastener to cooperate with said end plate to compress said resilient portion within said shroud portion to seal the cable.

11. The seal assembly of claim 1 comprising a pair of resilient portions received within said shroud portion with the cable placed in between said resilient portions, and further comprising an end plate configured to be received within said should portion, said end plate for compressing said resilient portions within said shroud portion to seal around the cable.

12. The seal assembly of claim 1 wherein said shroud portion comprises a top portion, a bottom portion, and a pair of side portions, and wherein said top, bottom and side portions define a cavity for receiving said resilient portion with the cable, said cavity defined by an outer edge of said shroud portion, said outer edge partially defined by a cutout portion in said top portion of said shroud.

13. The seal assembly of claim 1 wherein said shroud portion shrouds a pair of ports configured to receive and retain a pair of corresponding cables.

14. The seal assembly of claim 1 wherein the body is a housing assembly.

15. The seal assembly of claim 1 wherein the cable is an Ethernet cable.

16. A housing assembly for protecting at least one cable connection from the exterior environment, said housing assembly comprising:
    a shroud portion extending from said housing assembly to at least partially shroud the connection of the cable to said housing assembly; and
    at least one resilient portion configured to be received within said shroud portion to seal the cable from the exterior environment, said resilient portion adapted to be installed in said shroud portion at the cable connection and removed from against said shroud portion and from against the cable connection without uncoupling the cable from said housing assembly.

17. The housing assembly of claim 16 wherein said resilient portion is compressed when received and retained within said shroud portion.

18. The housing assembly of claim 16 comprising a pair of resilient portions received within said shroud portion with the cable placed in between said resilient portions.

19. The housing assembly of claim 18 wherein each resilient portion of said pair of resilient portions is substantially identical to one another.

20. The housing assembly of claim 18 wherein said resilient portions are symmetrically shaped relative one another and configured to mate with one another.

21. The housing assembly of claim 16 wherein said resilient portion comprises an interior space for receiving at least a portion of the cable, said interior space defined by at least one baffle portion to facilitate placement of the cable within said interior space of said resilient portion.

22. The housing assembly of claim 21 wherein said baffle portion is at least partially defined by scoring.

23. The housing assembly of claim 22 wherein a portion of said resilient portion is separated along said scoring to accommodate the cable.

24. The housing assembly of claim 16 further comprising an end plate configured to be received within said should portion, said end plate for compressing said resilient portion within said shroud portion to seal the cable.

25. The housing assembly of claim 24 further comprising an opening on the body within said shroud portion for receiving and retaining a fastener to cooperate with said end plate to compress said resilient portion within said shroud portion to seal the cable.

26. The housing assembly of claim 16 wherein said shroud portion comprises a top portion, a bottom portion, and a pair of side portions, and wherein said top, bottom and side portions define a cavity for receiving said resilient portion with the cable, said cavity defined by an outer edge of said shroud portion, said outer edge partially defined by a cutout portion in said top portion of said shroud.

27. The housing assembly of claim 16 wherein said shroud portion shrouds a pair of ports configured to receive and retain a pair of corresponding Ethernet cables.

28. A seal assembly for sealing a connector at its connection, said seal assembly comprising:
    a shroud portion to at least partially shroud the connection; and
    at least one resilient portion configured to be received within said shroud portion to seal the connector at its connection from the exterior environment and which can be removed from within said shroud portion and from against the connector without disconnecting the connector from its connection, wherein said resilient portion is compressed against the connector in its connection when received and retained within said shroud portion.

29. The seal assembly of claim 28 wherein said resilient portion is adapted to be installed without uncoupling the connector from its connection.

* * * * *